F. S. AVIL.
WIND SHIELD.
APPLICATION FILED AUG. 12, 1910.
988,538.
Patented Apr. 4, 1911.
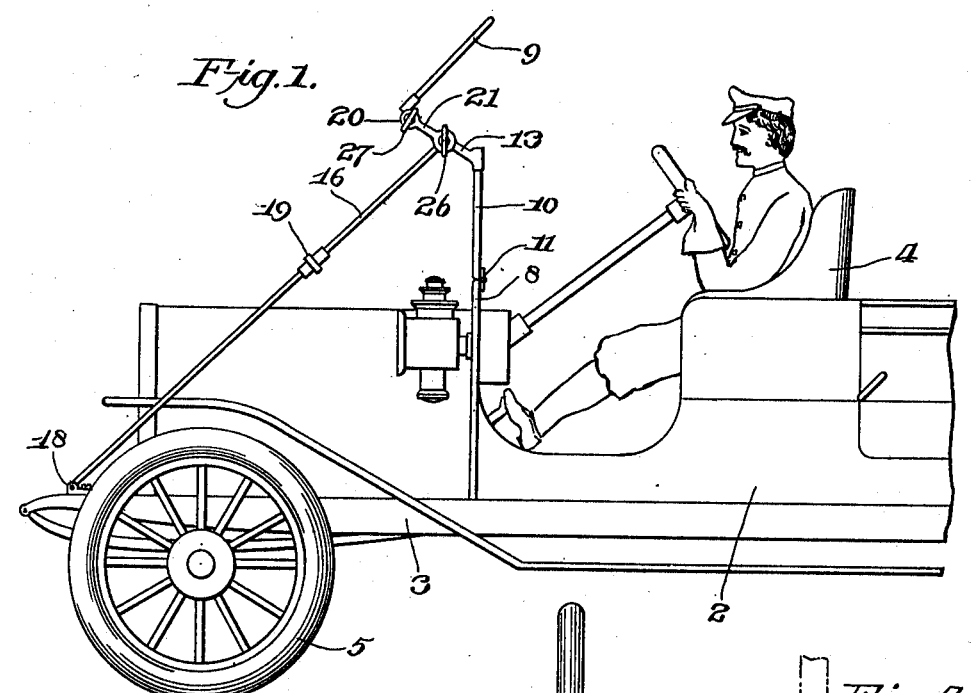
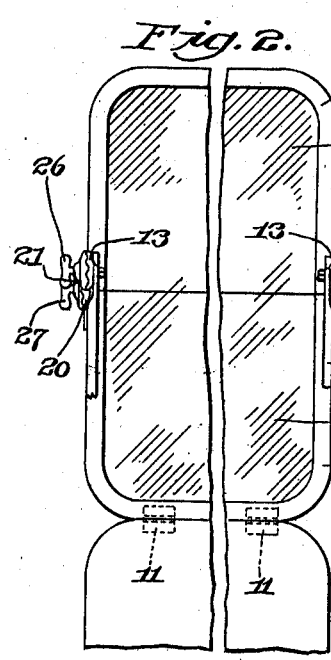
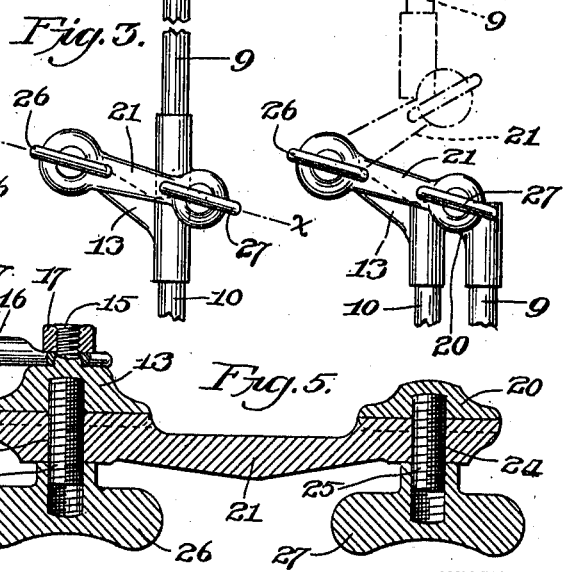
WITNESSES
INVENTOR
Frank S. Avil
BY
ATTORNEY

UNITED STATES PATENT OFFICE.

FRANK S. AVIL, OF COLLINGDALE, PENNSYLVANIA.

WIND-SHIELD.

988,538.   Specification of Letters Patent.   Patented Apr. 4, 1911.

Application filed August 12, 1910. Serial No. 576,865.

*To all whom it may concern:*

Be it known that I, FRANK S. AVIL, a citizen of the United States, residing at Collingdale, Delaware county, State of Pennsylvania, have invented certain new and useful Improvements in Wind-Shields, of which the following is a specification.

My invention relates to that class of wind shields for automobiles and other vehicles wherein a plurality of glass-containing frames are employed in combination with means for supporting the frames and holding them in various positions of adjustment relatively to each other and to other parts of the automobile.

The object of my invention is to provide a novel, simple and efficient wind shield having an upper and lower glass-containing frame, and having provision whereby the glass-containing frames may be adjusted in desirable positions relatively to each other and to other parts of the automobile, and whereby the glass-containing frames may be firmly held in such positions of adjustment.

The invention consists in the novel construction and combinations of parts hereinafter fully described and claimed.

In the drawings:—Figure 1 is a side elevation of the front portion of an automobile, provided with a wind shield embodying my invention. Fig. 2 is an elevation, enlarged, of the outer face of the wind shield and adjuncts, shown in a different position from that shown in Fig. 1. Fig. 3 is a side elevation of the wind shield, partly broken away, showing the parts in the positions shown in Fig. 2. Fig. 4 is a view similar to Fig. 3, showing the parts in another position. Fig. 5 is a section, enlarged, on line *x—x* of Fig. 3, showing one of the supporting links and adjuncts.

2 designates the main body of an automobile, 3 the supporting frame therefor, 4 the forward seat, 5 one of the forward carrying wheels, and 8 the dash board, all of which are of usual and well known construction.

My invention is adapted to be applied to the dash board 8 of the automobile and braced from the frame 3, and is of the following construction:—

9 and 10 designate, respectively, upper and lower glass-containing frames. The lower edge of the lower frame 10 is supported upon the upper edge of the dash board 8, by means of suitable hinges 11, on which the frame 10 may be moved to different positions of adjustment toward and from the seat 4. The lower frame 10 is substantially U-shaped, and has a glass 11 secured therein; and the upper frame 9 is substantially inverted U-shaped, and has a glass 12 secured therein.

Rigidly secured to the upper portions of the sides of the lower frame 10, are arms 13, which extend forwardly and upwardly from the frame 10, as shown. The inner faces of the upper ends of the arms 13 are provided with inwardly-extending screw-threaded studs 15 which extend through holes in the upper ends of brace rods 16, nuts 17 being provided upon the studs 15 to hold the rod 16 in place thereon. The brace rods 16 extend from the studs 15 to the forward portion of the frame 3, and are secured to brackets 18 thereon, thus serving to brace the lower frame 10. This brace rod 16 is, as usual, made telescopic in form, and is provided with a suitably arranged adjusting nut 19 by the manipulation of which the rod 16 may be lengthened or shortened to adjust the frame 10 on the hinges 11 toward and from the seat 4. The construction and operation of the telescopic brace rods 16 in this connection, are common and well known.

The outer, upper ends of the arms 13 are connected to lugs 20 on the upper frame 9 by links 21. One end of each link 21 has an opening 22 therein, through which a pivot stud 23 extends rigidly and outwardly from the upper end of the adjacent arm 13; and the other end of each link 21 has an opening 24 therein, through which a pivot stud 25 extends rigidly and outwardly from the adjacent lug 20 on the frame 9. The outer ends of the studs 23 and 25 are screw-threaded for the reception of clamping nuts 26 and 27 respectively. The clamping nuts 26 are adapted to be turned by hand to clamp and unclamp the upper ends of the arms 13 to and from the links 21; and the clamping nuts 27 are adapted to be turned to clamp and unclamp the lugs 20 of the frame 9 to and from the links 21.

The outer faces of the upper ends of the arms 13 are provided with alternating raised and depressed portions radiating from the studs 23 and the adjacent inner faces of the links 21 are provided with corresponding, alternating raised and depressed portions radiating from the openings 22 and adapted to engage the raised and depressed portions of the arms 13 to securely hold the links 21 relatively to the arms 13 when the nuts 26 are tightened; and the outer faces of the lugs 20 are provided with alternating raised and depressed portions radiating from the studs 25 and the adjacent inner faces of the links 21 are provided with corresponding, alternating raised and depressed portions radiating from the openings 24, and adapted to engage the raised and depressed portions of the lugs 20 to securely hold the links 21 relatively to the lugs 20 when the nuts 27 are tightened.

The lugs 20 extend downwardly and rearwardly from the bottom of the glass 12 contained within the frame 9; and the links 21 are made longer than the arms 13. These two features together with the arms 13 extending forwardly and upwardly to bring the studs 23 into positions above the top of the glass of the lower frame 10, and the supporting of the upper frame 9 entirely by the links 21, form important features of my invention, for the reason that they enable the upper frame 9 to be moved into various desirable positions of adjustment relatively to the lower frame 10, for example, when the frames 9 and 10 are adjusted to the positions shown in Fig. 1, the frames will effectually protect the occupants of the automobile from rain, and at the same time provide a suitable space between the top of the glass 11 and bottom of the glass 12, through which the driver of the automobile may see the road ahead. In this position of the frames, the top of the upper frame 9 would of course be located directly beneath the forward end of the automobile cover, not shown.

It will be observed that the links 21 are substantially equal in length to the arms 13 to enable the bottom of the upper glass-containing frame 9 to be lowered into registry with and directly upon the lower glass-containing frame 10 and also to enable the bottom of the upper glass-containing frame to be raised to a position directly above the top of the lower frame; and when herein I speak of the links 21 and arms 13 being of substantially equal length I mean that they shall be so proportioned that this result may be accomplished. The construction hereinbefore described also enables the upper and lower frames 9 and 10 to be brought into vertical position with the bottom of the upper frame 9 against the top of the lower frame 10, as shown in Figs. 2 and 3; and the construction also enables the upper frame 9 to be lowered inwardly of and to a position parallel to the lower frame 10 on the pivot studs 23, as shown in Fig. 4. The construction also enables the upper frame 9 to be raised above the lower frame 10 into a position in the same plane with the lower frame 10 and providing a space between the two frames due to the upwardly inclined arms 13. The frames 9 and 10 may also be adjusted into various other desirable positions too numerous to mention. It will of course be understood that before the links 21 are adjusted about the axis of the studs 23, the clamping nuts 26 will be loosened; and that before the frame 9 is adjusted about the axis of the studs 25 of the links 21, the clamping nuts 27 will be loosened. It will also be understood that after the desired adjustment has been made, the clamping nuts 26 and 27 will be tightened, thereby causing the upper frame 9 to be firmly and rigidly supported by the links 21 of the arms 13 on the lower frame 10.

I claim:—

1. In an automobile wind shield, the combination of a lower glass-containing frame; supporting means for said frame; arms rigidly connected to the upper portions of the sides of said frame and extending forwardly and upwardly therefrom; links pivoted to said arms above said frame said links being substantially equal in length to said arms; means for holding said links rigidly in positions of adjustment with relation to said arms; an upper glass-containing frame pivoted to said links substantially at the bottom of said upper frame; and means for holding said links rigidly in positions of adjustment with relation to said upper frame.

2. In an automobile wind shield, the combination of a lower glass-containing frame; supporting means for said frame; arms rigidly connected to the upper portions of the sides of said frame and extending forwardly therefrom; links pivoted to said arms said links being substantially equal in length to said arms; means for holding said links rigidly in positions of adjustment with relation to said arms; an upper glass-containing frame pivoted to said links substantially at the bottom of said upper frame and being adjustable with relation to said links while said links are held rigidly with relation to said arms; and means for holding said upper frame rigidly in positions of adjustment with relation to said links.

3. In an automobile wind shield, the combination of a lower glass-containing frame; supporting means for said frame; arms rigidly connected to the upper portions of the sides of said frame and extending forwardly and upwardly therefrom; links pivoted to said arms above said frame said links being substantially equal in length to said arms; means for holding said links rigidly in positions of adjustment with relation to said arms; an upper glass-containing frame pivoted to said links substantially at the bottom of said upper frame rearwardly of the main body of the upper frame; and means for holding said links rigidly in positions of adjustment with relation to said upper frame.

4. In an automobile wind shield, the combination of a lower glass-containing frame; supporting means for said frame; arms rigidly connected to the upper portions of the sides of said frame and extending forwardly and upwardly therefrom; links pivoted to said arms above said frame; means for holding said links rigidly in positions of adjustment with relation to said arms; an upper glass-containing frame having lugs projecting rearwardly from the lower portions of its sides and pivoted to said links; and means for holding said links rigidly in positions of adjustment with relation to said upper frame.

In testimony whereof, I affix my signature in the presence of two witnesses.

FRANK S. AVIL.

Witnesses:
A. V. GROUPE,
S. I. HARPER.

Copies of this patent may be obtained for five cents each, by addressing the "Commissioner of Patents, Washington, D. C."